United States Patent [19]

Herzog et al.

[11] Patent Number: 4,990,609
[45] Date of Patent: Feb. 5, 1991

[54] SULFOETHYL CELLULOSE OF HIGH SOLUTION QUALITY AND A PROCESS FOR ITS PRODUCTION

[75] Inventors: Dieter Herzog; Klaus Balser; Klaus Szablikowski, all of Walsrode, Fed. Rep. of Germany

[73] Assignee: Wolff Walsrode AG, Walsrode, Fed. Rep. of Germany

[21] Appl. No.: 282,078

[22] Filed: Dec. 9, 1988

[30] Foreign Application Priority Data

Dec. 11, 1987 [DE] Fed. Rep. of Germany ....... 3742104

[51] Int. Cl.$^5$ ..................... C08B 11/00; C07H 15/04
[52] U.S. Cl. ......................................... 536/92; 536/120
[58] Field of Search ...................... 536/84, 85, 86, 87, 536/88, 89, 90, 91, 92, 120

[56] References Cited

U.S. PATENT DOCUMENTS

| | | | |
|---|---|---|---|
| 2,580,352 | 12/1951 | Grassie | 536/92 |
| 2,811,519 | 10/1957 | Tovey | 536/92 |
| 4,650,863 | 3/1987 | Felcht et al. | 536/91 |

FOREIGN PATENT DOCUMENTS

| | | | |
|---|---|---|---|
| 0757540 | 8/1980 | U.S.S.R. | 536/92 |
| 1072021 | 6/1967 | United Kingdom . | |

OTHER PUBLICATIONS

Abstract Bulletin of the Institute of Paper Chemistry, vol. 35, No. 2, pp. 227–228, Nov. 1964.

Primary Examiner—Nathan M. Nutter
Attorney, Agent, or Firm—Sprung Horn Kramer & Woods

[57] ABSTRACT

Sulfoethyl cellulose prepared by addition of an alkylating agent and subsequent addition of alkali shows particularly valuable properties.

10 Claims, No Drawings

SULFOETHYL CELLULOSE OF HIGH SOLUTION QUALITY AND A PROCESS FOR ITS PRODUCTION

This invention invention relates to a sulfoethyl cellulose (SEC) of high solution quality and to a process for its production.

SEC is a water-soluble, ionic cellulose ether with interesting properties, cf. the chapter entitled bCelluloseether" in Ullmann's Encyclopadie der technischen Chemie, Vol. 9, pages 192-212 (Verlag Chemie, Weinheim, 1975).

An important quality criterion in the production of water-soluble cellulose ethers is the complete solubility in water of the products obtained. In other words, no fibers or gel particles leading to clouding of the aqueous solutions should remain behind on dissolution in water. Such clouding may be determined by measurement of the transmission of aqueous cellulose ether solutions.

According to US-A-2,132,181, SEC is produced by the kneader process which experience has shown to produce products containing relatively high proportions of fibers and gel particles. In addition, large excesses of sodium hydroxide are used, so that the production of these products is uneconomical. According to US-A-2,580,352, cellulose sulfoethyl ethers are produced by reaction of an alkaline polysaccharide suspension in an inert organic solvent.

T. Timell (Svensk Papperstidning 51 No. 11, 254–258, 1948) describes the production of SEC having DS (mean degree of substitution) values of at most 0.42 by reaction of alkali cellulose with sodium salts of haloethanesulfonic acids. In the Article in question, it is stated that SEC is soluble in water beyond DS values of 0.3 to 0.4. However, there is no mention whatever of the quality of the solution.

According to US-A-2,811,519, celluloses containing sulfoethyl and carboxymethyl groups may be prepared by reaction of cellulose with corresponding substances in the presence of alkali.

E. A. Plisko et al (Zh. Prikl. Khim. 36, 1.994–1.996, 1963) describe the production of SEC by reaction of alkali cellulose with the sodium salt of 2-chloroethanesulfonic acid. The slurry process used in this case only gives lowviscosity products (max. viscosity of a 1% solution in distilled water: 117 mPa.s) at temperatures of 80° to 130° C.

E.A. Plisko et al (Zh. Prikl. Khim. 50, No. 9, 2.003–2.005, 1967) describe the production of SEC from alkali cellulose by reaction with sodium chloroethanesulfonate. The products obtained have a maximum DS of 0.42 and a solubility of at most 99.7%. Accordingly, these products also cannot be completely free from fibers and gel particles.

SU 757 540 describes a two-stage process for the production of SEC, in which alkali cellulose is prepared in the first stage by reaction of cellulose with aqueous sodium hydroxide. The alkali cellulose thus prepared then has to be squeeze-dried and loosened up. A compression factor of the alkali cellulose, i.e. the ratio by weight of moist alkali cellulose to the dry cellulose used, of 3 is cited in the Examples. Experience has shown that this requires a high-pressure press known from the viscose industry (for example an immersion press) capable of applying pressures of up to 300 bar.

In the second stage, the squeeze-dried loosened alkali cellulose is reacted with a 2.5 to 16% solution of sodium vinyl sulfonate in a secondary or tertiary aliphatic alcohol at a liquor ratio of 1:30, the molar ratio of sodium vinyl sulfonate to cellulose being from 1:1 to 6:1. The reaction time at 60° to 90° C. is between 3 and 7 hours. The product is washed with 70 to 75% alcohol and dried.

According to the Examples, yields of 8.7 to 43%, based on the sodium vinyl sulfonate used, are obtained in this way.

The "solubility in water" of the products prepared in the Examples, of which no definition is provided, is between 99 and 100%. The disadvantage of this process lies on the one hand in the separate alkalization with the technically very complicated squeeze-drying step. On the other hand, it is only possible to obtain etherification products of low viscosity on account of the alkaline, oxidative degradation of the cellulose (known as preliminary ripening in the viscose process) which is unavoidable in this form of alkalization.

The use of SEC in drilling fluids is known from US-A-4,519,923. However, the SEC used is only characterized by its viscosity and degree of substitution. There is no reference either to the production process or to the solution quality.

JP 8 218 701 describes the production of SEC by reaction of alkali cellulose with sodium 2-chloroethanesulfonate with stepwise addition in an inert slurry medium However, the products obtained have a low degree of substitution (DS =0.33) and a transmission of only 80%, i.e. contain a high proportion of undissolved substances.

The object of the present invention is to provide sulfoethylated cellulose ethers (SEC) of high solution quality in all—including even the highest—viscosity ranges and an economic process for the production thereof.

The present invention relates to a sulfoethyl cellulose (SEC) having an average degree of substitution (DS) of from 0.4 to 1.4 and, more especially, from 0.5 to 1.2, a viscosity of 15 to 60,000 mPa.s and more especially from 100 to 50,000 mPa.s (as measured on a 2% by weight aqueous solution) at a shear rate of 2.5 sec.$^{-1}$ at 20° C. and a transmission (as measured on a 2% by weight aqueous solution in a cell having an opticalpath length of 10 mm with light having a wavelength of 550 nm) of more than 95% and, in particular, more than 96%.

The sulfoethyl cellulose according to the invention may be otherwise unsubstituted, although it may also contain other substituents typical of cellulose derivatives, more especially with formation of mixed ethers. Suitable mixed ethers are, for example, carboxymethyl sulfoethyl cellulose (CMSEC), hydroxypropyl sulfoethyl cellulose (HPSEC), hydroxyethyl sulfoethyl cellulose (HESEC), methyl sulfoethyl cellulose (MSEC), ethyl sulfoethyl cellulose.

The unsubstituted SEC is neutralized on completion of the etherification reaction, subsequently isolated and then, after re-alkalization, is reacted to form the desired ether in a second etherification step by addition of one or more alkylating agents, such as for example chloroacetic acid, propylene oxide, ethylene oxide, methyl chloride, ethyl chloride, etc., retaining its high quality in regard to transparency. Alternatively, the mixed etherification may even be carried out without purification and neutralization of the SEC prepared in the first step. In this case, any sodium hydroxide still present may be used with advantage for the second etherification step. This applies in particular where an alkali-consuming second substituent, such as for example methyl chloride, ethyl chloride or chloroacetic acid, is used. Where stoichiometric quantities of these alkylating agents are used, there is no need for neutralization.

The present invention also relates to a process for the production of sulfoethyl cellulose by reaction of cellulose with an alkylating agent, characterized in that 1. the alkylating agent is added to a ground cellulose suspended in alcohol at a pH value of preferably from 4 to 9,
2. the alkylating agent and the cellulose are then optionally mixed with one another,
3. the mixture is alkalized by addition of an alkali, particularly sodium hydroxide, more especially to a pH value of 11 to 14 and preferably to a pH value of 13 to 14,
4. the temperature is then increased, in particular to 55° to 100° C., for the etherification reaction and, optionally,
5 the product is neutralized, filtered and washed after etherification.

In one preferred embodiment, the molar ratio of cellulose to alkylating agent is 1:0.8 to 1:2.8.

In another preferred embodiment, the alkylating agent is a vinyl sulfonic acid, more especially the sodium salt. In a particularly preferred embodiment, production as a whole is carried out by the one-pot process.

The cellulose to be used as starting material in accordance with the invention is preferably cellulose linters, more especially containing more than 98% alpha-cellulose.

The sulfoethyl celluloses according to the invention are distinguished by complete solubility in water, i.e. the products are more than 99.95% soluble, as measured by the process described hereinafter.

The products obtained have such good properties that they may be used for any applications, including those where very high quality demands are imposed in regard to the absence of gel particles and fibers, as for example in the case of brush-applied and spray paints and cosmetic preparations.

The sulfoethylated cellulose derivatives are preferably produced by a one-pot process, i.. both the alkalization step and the etherification step are carried out in one and the same unit.

One preferred embodiment of the process is described in the following:

The reaction is preferably carried out in a cylindrical reaction vessel provided with a suitable stirrer which ensures adequate mixing of the heterogeneous reaction mixture. The reaction vessel is preferably closed to enable the reaction to be carried out in a nitrogen atmosphere. The reaction vessel is also preferably provided with a suitable temperature control unit.

The ground cellulose is preferably suspended in isopropanol and an aqueous solution of sodium vinyl sulfonate added to the resulting suspension. After addition of the aqueous solution of sodium vinyl sulfonate and intensive mixing, the product is alkalized by addition of aqueous sodium hydroxide over a period of 60 to 180 minutes at 0° to 35° C. The etherification step is then carried out by an increase in temperature to 55° to 100° C. At the end of the etherification time of 100 to 240 minutes, the sodium hydroxide is neutralized by addition of an acid and the product obtained is filtered off. The SEC obtained may be freed from adhering salts by washing with 70% methanol.

EXAMPLES

In the following Examples, parts are always parts by weight.

The viscosities are measured using a Haake type RV 100 rotational viscosimeter (system M 500, measuring arrangement MV) in accordance with DIN 53 019 at a shear rate D of 2.5 sec$^{-1}$ and at a temperature of 20° C. 2% by weight solutions in distilled water were measured in each case.

The transmission measurements were carried out in a Hitachi Model 101 spectral photometer (Hitachi Ltd., Tokyo, Japan). A glass cell having an optical path length of 10 mm was used. The wavelength used was 550 nm. 2% by weight solutions in distilled water were measured in each case.

To determine complete solubility in water, a quantity of the air-dry purified cellulose ether corresponding to 2,000 g bone dry substance was weighed in and dissolved in 198 ml distilled water. This solution is completely filtered under suction through a weighed G2 glass filter crucible dried to constant weight at 120° C. The filter crucible is then washed 5 times with 100 ml distilled water to remove adhering dissolved cellulose ether. The glass filter crucible is then redried to constant weight at 120° C. and weighed. The insoluble component is determined from the difference in weight and the percentage of soluble cellulose ether calculated therefrom. Within the limits of measurement accuracy, we define as completely soluble cellulose ethers which are more than 99.95% soluble in water.

EXAMPLE 1

113.4 parts chemical cellulose (cotton linters) are suspended in 2190 parts isopropanol in a cylindrical reaction vessel which is equipped with a suitable stirrer and with a suitable temperature control system and in which a nitrogen atmosphere can be established. 261 parts of a 48.8% by weight solution of sodium vinyl sulfonate are added to the resulting suspension, followed by thorough mixing for 15 minutes. 76.3 parts water and 67.2 parts sodium hydroxide are then added, followed by alkalization for 80 minutes at 25° to 30° C. The reaction mixture is then heated for 30 minutes to 75° C. and kept at that temperature for 180 minutes. The reaction mixture is then neutralized by addition of an equimolar quantity of concentrated acetic acid and the product is filtered off. The product is washed five times with 2000 parts of a mixture of 7 parts methanol and 3 parts water and dried in air. The product data are shown in Table 2.

EXAMPLES 2-5

Production is carried out in the same way as in Example 1, the production data being shown in Table 1.

EXAMPLES 6, 8, 10 and 12

Production is carried out as in Example 1, the production data being shown in Table 1.

COMPARISON EXAMPLES 7, 9, 11 and 13

Production is carried out as in Examples 6, 8, 10 and 12, the solution of sodium vinyl sulfonate being added after the end of the 80-minute alkalization period. The reaction mixture is then heated and the reaction completed as in the Examples mentioned above. The production data are shown in Table 1.

The product data are shown in Table 2. The yields of chemicals obtained in the production processes according to the invention (based on the sodium vinyl sulfonate used) are between 48 and 56% and are therefore distinctly higher than the yields hitherto reported in the literature.

The yields of chemicals obtained in the Comparison Examples (identified by an asterisk in Tables 1 and 2) amount to between 41.7 and 43.7% and are thus distinctly lower than the yields obtained in the associated Examples according to the invention.

The absence of fibers from the products, expressed by the transmission of the 2% by weight aqueous solutions, is good to excellent for the Examples according to the invention. The transmission values are above 95% for all the Examples By contrast, in the Comparison Examples, the transmission values are between 83 and 94.9%. Among the Comparison Examples, those in which the transmission is below 90% show a particularly high fiber content which no longer satisifies the standard quality requirements, more specially for cosmetics and brush-applied and spray paints.

The yield may be further increased by reusing the slurry medium. Part of the sodium vinyl sulfonate used as alkylating agent is not reacted during the reaction and is thus present in the slurry medium in solution together with the secondary products formed during the reaction and part of the sodium hydroxide.

By separation of the slurry medium from the solid reaction product before neutralization, it is possible to reuse the slurry medium with the alkylating agent still present therein.

The cellulose for the next reaction is suspended in this slurry medium and the necessary quantity of sodium vinyl sulfonate solution and isopropanol added. The quantity of sodium vinyl sulfonate is now smaller than is the case where fresh slurry medium is used. The product is subsequently alkalized by addition of sodium hydroxide and the reaction is then carried out as described above.

The sodium hydroxide used in the reaction largely remains in the solid product separated off and has to be neutralized in the first purification step of this product by addition of a corresponding quantity of acid (preferably acetic acid or formic acid). The quantity of sodium hydroxide remaining behind in the slurry medium after separation of the solid product is small and does not affect the repeat reaction. This reuse of the slurry medium may be repeated several times. A unit of the type described in Example 1 is used for all the Examples.

EXAMPLE 14

84 parts pine sulfite cellulose are suspended in 2200 parts isopropanol. 273 parts of a 30% by weight solution of sodium vinyl sulfonate are added to the resulting suspension and thoroughly mixed therewith. After 15 minutes, 5 parts water and 50.3 parts sodium hydroxide are added, followed by alkalization for 80 minutes at 25° to 30° C. with continued thorough stirring. The reaction mixture is then heated to 75° C. in 60 minutes and kept at that temperature for 120 minutes. The product is then filtered off and the filtrate used as slurry medium for the following reaction, Example 14b.

The product is suspended in 1000 parts methanol and neutralized with an equimolar quantity of acetic acid. It is then washed five times with 2000 parts of a mixture of 7 parts methanol and 3 parts water and dried in air. The product data are shown in Table 2.

EXAMPLE 14b

The slurry medium (2023 parts) obtained in Example 14a still contains 3 parts sodium hydroxide and 75 parts water. 300 parts isopropanol and 79 parts of a 52.2% by weight solution of sodium vinyl sulfonate are then added. 84 parts pine sulfite cellulose are then suspended in the resulting mixture, followed by thorough stirring for 15 minutes. 47 parts sodium hydroxide are then added, followed by alkalization for 80 minutes at 25° to 30° C. with thorough stirring. The mixture is then heated to 75° C. in 60 minutes and kept at that temperature for 120 minutes. The product is then filtered off, suspended in 1000 parts methanol and neutralized with equimolar quantities of acetic acid. The product is then washed five times with 2000 parts of a mixture of 7 parts methanol and 3 parts water and dried in air. The product data are shown in Table 2.

EXAMPLE 15a 84 parts cotton linters are suspended in 2200 parts isopropanol. 273 parts of a 30% solution of sodium vinyl sulfonate are added to the resulting suspension and thoroughly mixed therewith. After 15 minutes, 5 parts water and 50.3 parts sodium hydroxide are added, followed by alkalization for 80 minutes at 25° to 30° C. with thorough mixing. The mixture is then heated to 75° C. in 40 minutes and kept at that temperature for 120 minutes. The product is then filtered off and the filtrate is used as slurry medium for the following Example 15b. The product is suspended in 1000 parts methanol and neutralized with acetic acid. It is then washed five times with 2000 parts of a mixture of 7 parts methanol and 3 parts water and dried in air. The product data are shown in Table 2.

EXAMPLE 15 b

The slurry medium (2040 parts) obtained from Example 15a still contains 2.7 parts sodium hydroxide and 52 parts water. 280 parts isopropanol and 140 parts of a 46.2% solution of sodium vinyl sulfonate are added. 84 parts cotton linters are suspended in the resulting mixture, followed by thorough mixing for 15 minutes. 47.3 parts sodium hydroxide are then added, followed by alkalization for 80 minutes at 25° to 30° C. The mixture is then heated to 75° C. in 40 minutes and kept at that temperature for 120 minutes. The product is filtered off, suspended in 1000 parts methanol and neutralized with equimolar quantities of acetic acid. It is then washed five times with 2000 parts of a mixture of 7 parts methanol and 3 parts water and dried. The product data are shown in Table 2.

EXAMPLE 15c

The slurry medium (2030 parts) obtained from Example 15b still contains 4 parts sodium hydroxide and 54 parts water. 290 parts isopropanol and 140 parts of a 46.2% solution of sodium vinyl sulfonate are added. 84 parts cotton linters are suspended in the resulting mixture, followed by thorough mixing for 15 minutes. 47 parts sodium hydroxide are then added, followed by stirring for 80 minutes at 25° to 30° C. The mixture is then heated to 75° C. in 40 minutes and kept at that temperature for 120 minutes. The product is filtered off, suspended in 1000 parts methanol and neutralized with equimolar quantities of acetic acid. The product is then washed five times with 2000 parts of a mixture of 7 parts methanol and 3 parts water and dried. The product data are shown in Table 2.

By reusing the slurry medium, the yield of chemicals, based on sodium vinyl sulfonate, can be increased to more than 70%. The aqueous solution of sodium vinyl sulfonate is again added before the alkalization step. The reused slurry medium also gives products of high quality (transmission of an aqueous 2% solution >95%). Because of the higher yield of chemicals, economy is even better than in the process where the slurry medium is not reused.

EXAMPLES 16 and 17

The SEC used as starting material for Examples 16a and 17a are prepared as in Example 1. The exact production data are shown in Table 1 and the product data in Table 2.

EXAMPLE 16a

Preparation of a methyl sulfoethyl cellulose (MSEC) from an SEC according to the invention:

173 parts (dry content: 87.97%) of the SEC prepared in Example 16 are introduced into a pressure reactor equipped with a wall-sweeping propeller stirrer and the reactor is purged with nitrogen. 29 parts sodium hydroxide are dissolved in 29 parts water and the resulting solution sprayed with continuous stirring onto the SEC. The mixture is stirred for 80 minutes at 25° C. 121 parts methyl chloride are added and the mixture heated to 75° C. in 60 minutes. This temperature is maintained for 230 minutes with continuous stirring. The mixture is then cooled to 25° C. in 25 minutes. Before the product is removed, a vacuum is applied to remove volatile constituents. After deaeration, the product is washed with methanol until it is salt-free.

The product data are shown in Table 3.

EXAMPLE 17a

Preparation of a hydroxyethyl sulfoethyl cellulose (HESEC) from an SEC according to the invention:

172 parts (dry content: 88.2%) of the SEC prepared in Example 17 are suspended in 2340 parts tert.-butanol in a pressure reactor equipped with an anchor stirrer. The reactor is purged with nitrogen and 29 parts sodium hydroxide dissolved in 152 parts water are added. The mixture is stirred for 80 minutes at 25° C. 106 parts ethylene oxide are then added, followed by heating for 60 minutes to 40° C. The temperature is maintained for 300 minutes. After cooling to 25° C. in 30 minutes, the mixture is neutralized by addition of 44 parts glacial acetic acid. The product is separated off and washed with methanol until salt-free. The product data are shown in Table 3.

TABLE 1

Production Conditions
Examples 1 to 13, 16, 17
Explanation of Table 1

| | |
|---|---|
| VSNa: | sodium vinyl sulfonate |
| NaOH: | sodium hydroxide |
| $H_2O$: | water |
| VSNa addition: | time at which the aqueous solution of sodium vinyl sulfonate was added to the reaction mixture: |
| Before alkal: | before addition of the sodium hydroxide |
| After alkal: | 80 minutes after addition of the sodium hydroxide |
| Linters: | chemical cellulose of ground, bleached cotton linters, particle size <0.4 mm |
| Pine: | chemical cellulose of ground, bleached pine celloulose, particle size <0.4 mm |
| $N_2$: | the entire reaction was carried out under nitrogen |
| Air: | the entire reaction was carried out in air |

| Example | Isopropanol [parts] | Cellulose type | Cellulose [parts] | VSNa solution [parts] | Conc. of VSNa solution [wt. %] | NaOH [parts] | $H_2O$ [parts] | VSNa addition | Heating time [mins] | Reaction time [mins] | Reaction temp. [°C.] | Atmosphere |
|---|---|---|---|---|---|---|---|---|---|---|---|---|
| 1 | 2190 | Linters | 113.4 | 261 | 48.8 | 67.2 | 76.3 | Before alkal. | 30 | 180 | 75 | N2 |
| 2 | 2190 | Pine | 127 | 390 | 52.4 | 75.5 | 10 | Before alkal. | 60 | 120 | 70 | Air |
| 3 | 2190 | Linters | 129.6 | 298 | 48.8 | 76.8 | 57.3 | Before alkal. | 30 | 180 | 75 | N2 |
| 4 | 2157 | Linters | 113.4 | 303 | 30 | 67.2 | 40 | Before alkal. | 60 | 150 | 75 | N2 |
| 5 | 2157 | Linters | 113.4 | 303 | 30 | 67.2 | 40 | Before alkal. | 45 | 150 | 65 | N2 |
| 6 | 2190 | Linters | 97.26 | 231 | 47.2 | 57.6 | 88 | Before alkal. | 30 | 180 | 75 | N2 |
| 7* | 2190 | Linters | 97.26 | 231 | 47.2 | 57.6 | 210 | After alkal. | 30 | 180 | 75 | N2 |
| 8 | 2190 | Pine | 121.5 | 268.5 | 47.2 | 54 | 83 | Before alkal. | 30 | 150 | 75 | N2 |
| 9* | 2190 | Pine | 121.5 | 268.5 | 47.2 | 54 | 225 | After alkal. | 30 | 150 | 75 | N2 |
| 10 | 2190 | Linters | 113 | 297 | 42.9 | 67.2 | 40 | Before alkal. | 30 | 180 | 75 | N2 |
| 11* | 2190 | Linters | 113 | 297 | 42.9 | 67.2 | 210 | After alkal. | 30 | 180 | 75 | N2 |
| 12 | 2190 | Linters | 121.5 | 318 | 42.9 | 72 | 28 | Before alkal. | 50 | 180 | 75 | N2 |
| 13* | 2190 | Linters | 121.5 | 318 | 42.9 | 72 | 210 | After alkal. | 50 | 180 | 75 | N2 |
| 16 | 2190 | Linters | 127 | 333.5 | 42.7 | 75.5 | 28 | Before alkal. | 60 | 180 | 75 | N2 |
| 17 | 2190 | Linters | 127 | 333.5 | 42.7 | 75.5 | 28 | Before alkal. | 60 | 180 | 75 | N2 |

*Comparison

TABLE 2

Product data
Examples 1 to 16, 17
Explanation of Table 2

| | |
|---|---|
| Dry content: | Crude prodcut (air-dry) minus moisture, in % |
| DS: | Degree of substitution, number of substituents per anhydroglucose unit |

TABLE 2-continued

Product data
Examples 1 to 16, 17
Explanation of Table 2

| | |
|---|---|
| Yield of chemicals: | Quantity of alkylating agent reacted to the product in % of the sodium vinyl sulfonate used |
| Transmission: | Proportion of light which penetrates in % of the incident light on passage through a cell filled with a 2% cellulose ether solution. Optical path length of the cell = 10 mm, wavelength used $\lambda$ = 550 nm |

| Example No. | Dry content [%] | Viscosity, 2% in dist. $H_2O$ [mPa.s] | DS Sulfoethyl | Transmission [%] | Yield of chemicals [%] | Water-soluble component [%] |
|---|---|---|---|---|---|---|
| 1 | 81.7 | 28,200 | 0.69 | 96.8 | 49.3 | 99.99 |
| 2 | 86.9 | 101 | 1.02 | 97.9 | 51 | 99.985 |
| 3 | 87.2 | 31,200 | 0.69 | 97.9 | 49.3 | 99.975 |
| 4 | 84.8 | 49,300 | 0.55 | 97.2 | 55 | |
| 5 | 86.7 | 39,100 | 0.54 | 96.3 | 54 | |
| 6 | 89.92 | 36,000 | 0.71 | 96 | 50.7 | 99.985 |
| 7* | 90.24 | 67,600 | 0.61 | 92.5 | 43.4 | |
| 8 | 91.1 | 1,660 | 0.73 | 98 | 56.1 | 100 |
| 9* | 90.17 | 14,300 | 0.54 | 94.9 | 41.7 | |
| 10 | 90.57 | 25,800 | 0.73 | 97 | 52.4 | 99.99 |
| 11* | 89.87 | 85,200 | 0.59 | 83 | 42.4 | |
| 12 | 90.22 | 22,300 | 0.71 | 96 | 50.7 | 99.985 |
| 13* | 89.49 | 79,500 | 0.6 | 87 | 43.1 | |
| 14a | 83.93 | 14,100 | 0.63 | 97 | 52.4 | 99.99 |
| 14b | 85.05 | 19,400 | 0.42 | 96 | 70.4 | 99.97 |
| 15a | 84.7 | 6,630 | 0.62 | 95.1 | 52 | |
| 15b | 86.1 | 5,020 | 0.57 | 95.1 | 60 | |
| 15c | 86.5 | 5,920 | 0.55 | 95.2 | 58 | |
| 16 | 87.97 | 37,200 | 0.7 | 96 | 50 | 99.96 |
| 17 | 88.2 | 29,700 | 0.72 | 97 | 51.4 | 99.975 |

*Comparison

TABLE 3

Product data
Examples 16a and 17a
Explanation

| | |
|---|---|
| Dry content: | Crude product (air-dry) minus moisture, in % |
| DS: | Degree of substitution, number of substituents per anhydroglucose unit |
| Yield of chemicals: | Quantity of alkylating agent reacted to the product in % of the sodium vinyl sulfonate used |
| Transmission: | Proportion of the light which penetrates in % of the incident light on passage through a cell filled with a 2% cellulose ether solution. Optical path length of the cell = 10 mm, wavelength used $\lambda$ = 550 nm. |
| MS: | Molar degree of substitution. Proportion of the substituent unit per anhydroglucose unit. |

| Example No. | Dry content [%] | Viscosity, 2% in dist. $H_2O$ [mPa.s] | DS Sulfoethyl | Transmission [%] | DS Methyl | MS Hydroxyethyl |
|---|---|---|---|---|---|---|
| 16a | 88.9 | 15,100 | 0.7 | 96.7 | 0.87 | — |
| 17a | 89.4 | 12,700 | 0.72 | 96.3 | — | 0.43 |

We claim:

1. In the preparation of a sulfoethyl cellulose by reacting cellulose with a sulfoethylating agent, the improvement which comprises effecting the reaction by
   (a) grinding the cellulose,
   (b) combining the ground cellulose with the sulfoethylating agent,
   (c) adding alkali and
   (d) raising the temperature to effect the reaction.

2. The process according to claim 1, including the further step (e) of neutralizing, filtering and washing the product of step (d).

3. The process according to claim 1, wherein between steps (c) and (d) the combined materials of step (b) are permitted to stand for about 60 to 180 minutes from about 0° to 35° C.

4. The process according to claim 1, wherein the sulfoethylating agent is a vinyl sulfonic acid.

5. The process according to claim 1, wherein the steps (a), (b), and (c) (d) are carried out consecutively in the same vessel.

6. The process according to claim 1, wherein the cellulose is selected from the group consisting of linters, softwood sulfite cellulose, softwood sulfate cellulose and hardwood cellulose.

7. The process according to claim 1, wherein step (d) is continued for sufficient time to result in a DS-sulfoethyl of at least 0.4.

8. The process according to claim 1, wherein step (d) is continued for sufficient time to result in a DS-sulfoethyl of at least 0.5.

9. The process according to claim 1, wherein step (b) is effected in an alcohol slurry.

10. The process according to claim 9, wherein the alcohol is isopropanol.

* * * * *